United States Patent [19]

Mez

[11] Patent Number: 4,940,264
[45] Date of Patent: Jul. 10, 1990

[54] FLANGE CONNECTION

[76] Inventor: Georg Mez, Silberdistelweg 68, 7410 Reutlingen-Gonningen, Fed. Rep. of Germany

[21] Appl. No.: 599,501

[22] Filed: Apr. 12, 1984

[30] Foreign Application Priority Data

Apr. 13, 1983 [DE] Fed. Rep. of Germany ....... 3313235

[51] Int. Cl.$^5$ .............................................. F16L 23/00
[52] U.S. Cl. .................................... 285/405; 285/424; 285/363
[58] Field of Search ................. 285/405, 406, 424, 363

[56] References Cited

U.S. PATENT DOCUMENTS

| 4,123,094 | 10/1978 | Smitka | 285/405 |
| 4,288,115 | 9/1981 | Sullivan | 285/424 X |
| 4,304,423 | 12/1981 | Mez | 285/424 X |
| 4,508,376 | 4/1985 | Arnoldt | 285/424 X |

FOREIGN PATENT DOCUMENTS 2221312 12/1979 Fed. Rep. of Germany ...... 285/424

Primary Examiner—Richard J. Scanlan, Jr.

[57] ABSTRACT

In the case of a flange connection for rectangular air conditioning ducts which have four walls, four flange profiles with four rectangular angle-pieces are fitted frame-wise on the end of a duct portion. The flange profiles are in this case subhstantially L-shaped hollow profiles which are in each case fitted onto a duct wall and fixed there with a plurality of spot welds. Problematical is the seal between the inner arm of the flange profile and the duct wall, because by reason of spot welds which are situated close to but at a distance from one another, air can flow out into the free atmosphere between them and over the end face of the duct wall. In order to achieve better tightness, there is formed into the hollow profile a bead extending from the front radial portion. An inner arc of the bead lies with a clamping fit on the top of the duct wall and presses it against the inner longitudinal arm so achieving a seal which it is possible easily to implement in manufacture. The arc and the arc which merges into the inner longitudinal arm have relatively large radii, so that manufacturing the profile on a profile rolling plant presents no difficulties. Application: to the manufacture of prefabricated partial ducts for rapidly assembling air conditioning ducts, for purposes of ventilation, heating or cooling large projects.

12 Claims, 1 Drawing Sheet

FLANGE CONNECTION

The invention relates to a flange connection for rectangular air conditioning ducts having four walls. More particularly, such a flange connection has four substantially L-shaped hollow flange profiles made from sheet metal and four rectangular angle-pieces. Viewed in the longitudinal direction of the profile, the flange profiles have substantially one first longitudinal member parallel with the geometric longitudinal axis of the air conditioning duct and bearing on the inside face of duct wall, a first radial arm at a right-angle to the geometrical longitudinal axis, emanating from the first longitudinal member and disposed in front of the end face of the duct wall, an outer arm emanating from the first radial arm and extending back to behind the end face of the duct wall, a second radial arm emanating from the outer arm and extending at a distance from and parallel with the first radial arm, an oblique arm extending from the radial arm and at approximately half the height of the first radial arm, and a second longitudinal arm emerging from the oblique arm and bearing on the outside face of the duct wall, opposite said first longitudinal arm.

The flange profiles also have a bead shaped into the hollow profile from the first radial arm. The bead has a first bent-over portion approximately at a right angle to and starting from the first radial arm and situated opposite and at a distance from the outer arm. The bent-over portion comprises a first web. The angle pieces have ends with a rectangular cross-section inserted with a close fit between the radial arms, the outer arm, and the first web, and into end zones of the flange profiles. The bead also has a second web disposed between the first web and the first longitudinal arm. The second web merges at one end at a second bent-over portion into the first longitudinal arm and is connected at the other end, via a first substantially semi-circular arc, to the first web.

BACKGROUND OF THE INVENTION

A flange connection of this type is known, for example, from German Offenlegungsschrift No. 22 21 312. In the case of this known flange profile there is fitted between the second web of the bead and the first longitudinal arm a seal which is intended to prevent air passing through the gap between the first longitudinal arm and the inside of the duct wall and then over the end face of the duct wall and to the outside. Such a seal which is located inside the hollow profile cannot however be sufficiently reliable in use. In fact, the only feasible solution is an injected sealing composition. As the flange profiles are sometimes of quite considerable length, however, it is impossible to ensure a sufficiently quantity of sealing composition being present everywhere along this cavity. Therefore, it is not possible adequately to ensure the intended sealing effect. In addition, even with permanently elastic seals, their elasticity can only be retained for a limited time, particularly in elevated working temperatures which, in the case of air conditioning ducts, may be as much as 60° C., so that they rapidly lose their sealing effect.

German Auslegeschrift No. 23 13 425 likewise discloses a flange connection of the type mentioned at the outset. In the case of the flange profile shown therein, the second web of the bead forms together with the first longitudinal arm a wedge-shaped slot into which it is intended that the end face of the duct wall should be clampingly inserted. Accordingly, the sealing action is intended to be established along the end edge of the duct wall. In practice, however, this causes considerable difficulties because above all these end edges of the duct walls diverge greatly from what is the ideal straight line. Thus they exhibit varying degrees of burr formation and in addition have become misshapen due to relatively rough handling in transport and at the assembly site. Furthermore, the construction of profile illustrated is extremely unfavourable from the manufacturing point of view. This narrow wedge-shaped groove calls for correspondingly narrow rolling and the rollers are subjected to an enormous loading. The sheet metal undergoes extreme deformation particularly in the region of the bead, which on the one hand denotes considerable wear and tear on the rolling tools and on the other considerable likelihood of fracture in the overstressed material. This is disadvantageous in that air conditioning ducts are caused to undergo considerable oscillation due to currents of air in the low frequency and high frequency vibration range. In order to avoid damage resulting therefrom, it is necessary to follow the rolling operation on the flange profile with either some annealing process or a heavily stressable and thus more expensive material must be used in its manufacture. The wedge-shaped surface cannot be produced in any technologically feasible arrangement.

OBJECTS AND STATEMENT OF THE INVENTION

The object of the invention, therefore, is so further to develop a flange connection of the type indicated that as little air as possible can escape between the duct wall and the flange profiles. In particular, it is intended that the sealing effect should be permanent, easily achieved and capable of being perfectly predetermined during manufacture. The sealing effect should also be substantially unaffected by damage to the end edge of the duct wall. It should be possible for the flange profile to be manufactured with less heavily loaded rolls, the material stresses being reduced at the same time. In order to produce the flange profiles, inexpensive material should be used and require no secondary treatment.

This problem is resolved by the following features:

The second bent-over portion is a second substantially semi-circular arc which merges directly into the first longitudinal arm from the second web, and the bead in the region of the first arc is constructed to bear with a clamping fit on the outside of the duct wall.

The advantage of the embodiment according to the invention lies particularly in the fact that the flange profile has no bending zones which are over-stressed, which means that it can be produced with less heavily loaded rolls and also formed with relatively wide rolls. Therefore, a normal quality metal sheet can be used and no secondary annealing is required. A good and lasting sealing effect results from the fact that the beaded edge presses the duct wall against the first longitudinal arm, in fact at a greater distance behind the end face of the duct wall. Any burrs or nicks or other deformation of the end face cannot have any effect, which means it is possible to achieve the seal in a manner which can be predetermined without difficulty during manufacture.

Advantageously, the invention includes the following additional features:

When the flange profile is not applied against a duct wall, the first arc is spaced a distance from the first longitudinal arm which is less than the thickness of the duct wall. This feature ensures that the duct wall is properly clamped.

When the flange profile is not applied against a duct wall, the second arc is constructed to bear against the first web, particularly with an initial force. This feature enhances the clamping pressure.

The first radial arm is in line with a tangent which can be applied against the outside face of the second arc. This feature counteracts the propagation of air turbulence inside the air conditining duct.

An edge plate having an arm held with a clamping fits between the second arc and the first web. The edge plate has a further arm projecting radially into the air conditioning duct. The second arc is set back in relation to the first radial arm so that the outside face of the first radial arm is aligned with the outside face of the further arm. By reason of this feature, it is possible to integrate into the flange connection an edge plate which, in known manner, serves to secure insulating panels which are located within the air conditioning duct.

When the flange profile is not applied against a duct wall, the gap between the first and second longitudinal arms is somewhat greater than the thickness of the duct wall, and the first arc extends quite close to the oblique arm, and preferably is in light contact with the oblique arm. These features achieve a further increase in clamping pressure.

The first and second longitudinal arms are connected to the duct wall between them by a row of spot welds disposed serially in the longitudinal direction of the profile. The spot welds are spaced a a longitudinal distance from the first radial arm. The first arc bears on the outside of the duct wall at approximately one-quarter of this longitudinal distance, or approximately half this longitudinal distance. These features indicate references to particularly preferred dimensioning.

The first and second arcs have the same radius, and extend in each case over an angular segment of between approximately 190° to 200°. These features disclose particularly convenient embodiments of the invention.

DESCRIPTION OF THE DRAWINGS

The invention will be explained in greater detail hereinafter with reference to examples of embodiment illustrated in the accompanying drawings, in which.

DETAILED DESCRIPTION

Figure 1:
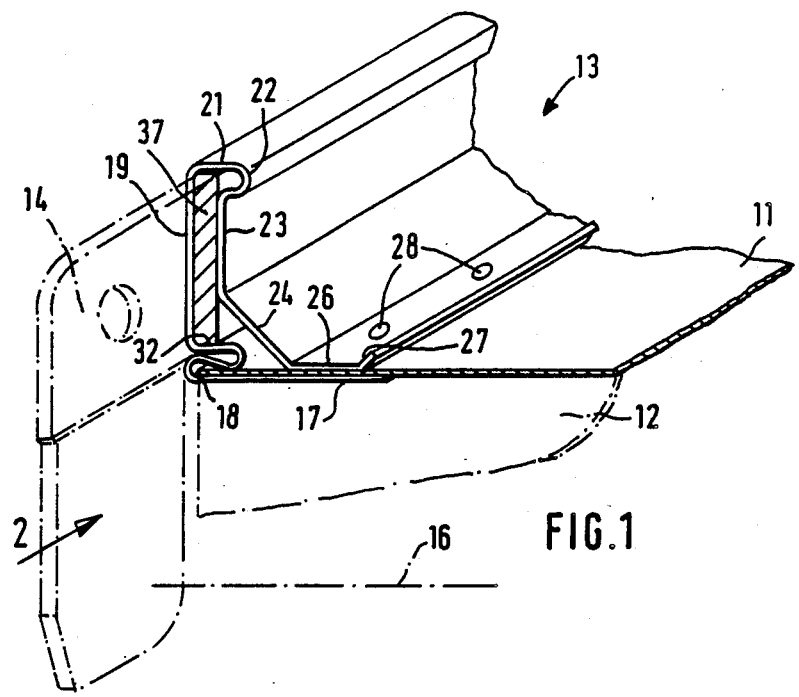
FIG. 1 shows a particularly preferred embodiment of flange connection according to the invention, only part of a duct wall being illustrated.

An air conditioning duct consists of four duct walls of which, for the sake of greater clarity, FIG. 1 only shows an upper duct wall 11 while dash-dotted lines indicate a lateral duct wall 12 adjacent thereto. Mounted on the ends of each duct wall is a flange profile 13, the four frame-wise disposed flange profiles being connected by angle pieces 14 inserted into their end zones and of which FIG. 1 shows one in dash-dotted lines. Air conditioning ducts, or more precisely partial ducts, are prefabricated in this manner and carry such flange profiles 13 at both ends. A plurality of partial ducts are laid one against another on site and are connected to one another as air-tightly as possible by their abutting flange profiles. A geometrical longitudinal axis 16 can be associated with the air conditioning duct. In relation to this geometrical longitudinal axis 16, it is possible to sub-divide the flange profile 13 into the following zones, looking in the longitudinal direction of the profile, in other words in the direction of the arrow 2:

A first longitudinal arm 17 bearing on the inside face of the duct wall 11, a first radial arm 19 extending from the longitudinal arm 17 and disposed in front of the end face 18 of the duct wall 11 and orientated at a right-angle thereto, an outer arm 21 starting therefrom and extending back behind the end face 18 of the duct wall 11 and having in this example a convex shape 22, a second radial arm 23 extending therefrom at a distance from and parallel with the first radial arm 19, an oblique arm 24 extending therefrom at about half the height of the first radial arm 19 and, starting therefrom, a second longitudinal arm 26 which bears on the outside face of the duct wall 11.

Adjacent the second longitudinal arm 26 is an oblique guide lip 27. The first longitudinal arm 17, the duct wall 11 and the second longitudinal arm 26 are connected to one another by a series of spot welds 28 disposed one after another.

The profile views in the drawings are true-to-scale reproductions of the structural drawings. FIG. 2 once again shows the flange profile 13 described with reference to FIG. 1 but in a view according to the direction of the arrow 2, in order to show more clearly the details which are essential to the invention. Starting from the first radial arm 19, a rolled bead 29 is formed into the hollow profile and has a first web 32 extending from a first bent portion 31 on the first radial arm 19 and approximately at a right-angle to this latter. After a first semi-circular arc 33, there follows a second web 34 which merges via a second arc 36 directly into the first longitudinal arm 17.

According to FIG. 1, the end of the angle piece 14 which has a cross-section 37 shown in the drawing as a shaded area is inserted with a close fit between the radial arms 19 and 23, the outer arm 21 and the first web 32 into the end zone of the flange profile 13. When a flange connection is made up, initially four such flange profiles 13 are connected by four angle pieces 14 into a frame which is then fitted onto the open end of the air conditioning duct and then secured by the spot welds 28 in the manner described. During this pushing-on process, the oblique guide lip 27 assists assembly. Pushing-on does not initially require much force until the end face 18 abuts against the first arc 33. Now this pressure point is overcome by the application of somewhat more force and the duct walls 11 force themselves between the first arc 33 and the longitudinal arm 17, the first arc 33 acting at the same time as an oblique guide lip. Once the fitter has overcome this pressure point, he can quite clearly feel that the flange profiles are correctly and completely fitted onto the duct walls. The clamping fit also ensures that the flange profiles cannot flip in the meantime, before the spot welds 28 have been applied. The configuration of the two arcs 33 and 36 in conjunction with the second web 34 acts as a clamping spring which is capable of accommodating duct walls 11 made from sheet metal ranging from 0.75 to 1.5 mm thickness. Here, therefore, considerable play is available both with regard to usage and tolerance. By reason of the fact that the first web 32 is, at least in the end zones of the flange profiles, supported by the inserted ends of the angle pieces 14, there is considerable contact pressure at the point of contact between the first arc 33 and the duct wall 11. The first arc 33 also reinforces the profile very effectively, so that even undulations in the duct wall 11 can be pressed flat.

Figure 2:
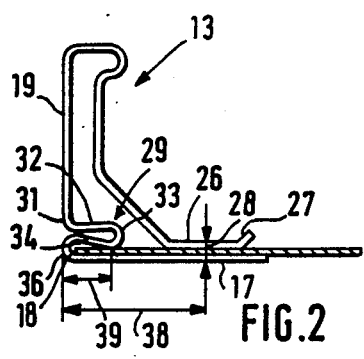
FIG. 2 is a view in the direction of the arrow 2 according to FIG. 1.

As FIG. 2 shows, the two arcs 33 and 34 are preferably of the same radius and in fact a radius of 2.5 mm in relation to the centre of the material. The bead can therefore be produced to a measure which is reasonable from the manufacturing point of view. When fitted, the flange profiles which bear on one another are clamped against one another substantially in the region of the curvature 22. So that the opening formed in the first radial arm 19 by the bead 29 does not result in that end of the flange profile which is opposite the clamping point and relatively and radially quite some distance inwards likewise clinging on the first radial arm 19 with a springing action and so tending to suffer vibrations, there is provision for the second arc 36 to bear on the first web preferably with some initial tension.

According to FIG. 2, the spot wells 28 are at a longitudinal distance 38 from the first radial arm 19. In the case of the example of embodiment, this longitudinal distance 38 amounts to some 30 mm. At a distance 39 of about one-quarter of the longitudinal distance 38 from the end face 18 of the duct wall 11, the first arc 33 presses against the outside wall of the duct wall 11. In the case of the example of embodiment illustrated, this gap 39 measures about 7 mm.

Figure 3:
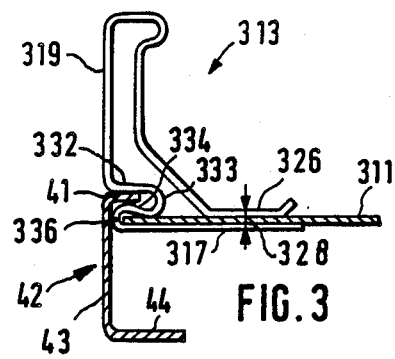
FIG. 3 shows a view corresponding to that in FIG. 2 but according to a second embodiment of the invention.

According to the preferred embodiment of FIGS. 1 and 2, the outside face of the first radial arm 19 is aligned with a tangent which can be applied against the outside face of the second arc 36. A variation on the invention which differs from the embodiment only on this point is shown in FIG. 3. Therefore, since all the essential elements are the same, then in order to ensure better illustration, they are identified by the same reference numerals but in each case raised by 300. Here, between the outer web 332 and the second arc 336 there is inserted with a clamping fit an arm 41 of an edge plate 42. This edge plate 42 has a further arm 43 which projects radially into the air conditioning duct. The second arc 336 is so far set back in relation to the first radial arm 319 that the outside face of the first radial arm 319 is aligned with the outside face of the further arm 43. Adjacent to the further arm 43 is a third arm 44 which extends parallel with the duct wall 311. Between this arm 44 and the duct wall 311, it is possible to secure an insulating panel in a manner not shown here in greater detail.

Figure 4:
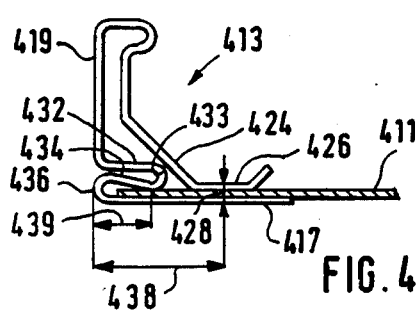
FIG. 4 shows a view corresponding to that in FIG. 2 but of a third embodiment of the invention.

FIG. 4 shows a further alternative embodiment of the invention. Since the individual elements agree substantially with those already described in connection with FIGS. 1 and 2, then in this case also, equivalent parts are identified by reference numerals which are the same except that they have been raised by 400. This flange profile 413 is distinguished in that, so long as it is not welded to the duct wall 411, it has between its longitudinal arms 417 and 426 a gap which is somewhat greater than the thickness of the duct wall 411. Furthermore, the first arc 433 in FIG. 4 is displaced so far rightwardly that it comes very close to and preferably lightly touches the oblique arm 424. Now, as soon as the spot welds 428 have been applied, the oblique arm 424 presses against the first arc 433 causing this now to be pressed against the duct wall 411 but with increased pressure. The spot welds 428 are at a longitudinal distance 438 from the first radial arm 419. The first arc 433 presses at a distance 439 on the outside face of the duct wall 411, which amounts to approximately half the longitudinal distance 438. The advantage of this developed embodiment lies in the increased pressure of application. In contrast, the particularly preferred embodiment according to FIG. 1 offers the advantage that the flange profile 13 can be shaped from a narrower strip of sheet metal and the rolling depth is less.

The example of embodiment shown in FIG. 4 can be modified in the same way as that in FIG. 3.

According to FIG. 2, the second web 34 is inclined by about 20° obliquely in relation to the duct wall 11. Accordingly, both arcs 33, 36 extend in each case over an angular segment of some 200°. According to FIG. 4, the second web 434 is inclined to the duct wall 411 by a somewhat flatter angle of about 10°. The arcs 433 and 436 therefore extend over an approximately 190° segment of angle.

In general, the sealing effect is based on surface pressure between the duct wall and the inner longitudinal arm of the flange profile.

The outer longitudinal rib pressing against it and the cross-section of which constitutes the first arc presses in turn more in the form of linear pressure and can straighten undulating distortions of the duct wall in order thus to increase the sealing action on the actual sealing surfaces. The sealing surfaces lie on the one hand sufficiently far behind the end edge of the duct wall in order not to be adversely influenced by its structure but on the other hand also near enough to fix the frame flanges in a stable fashion and also support the end edge. The webs function as pressure springs. In the end zones of the frame flanges, the ends of the angle piece which extend over a part of the first web also produce an additional amplification of the applied pressure.

I claim:

1. In a flange connection for rectangular air conditioning ducts having four walls about a geometric longitudinal axis, said flange connection having:
   (a) four substantially L-shaped hollow flange profiles made from sheet metal
   (b) viewed in the longitudinal direction of the profile, said flange profiles having substantially: a first longitudinal arm arranged to be parallel with the geometric longitudinal axis of the air conditioning duct and to bear when the flange connection is assembled on the inside face of the duct wall,
   a first radial arm at right-angles to the geometrical longitudinal axis of the air conditioning duct, emanating from said first longitudinal arm for location in front of the end face of the duct wall,
   an outer arm emanating from said first radial arm and arranged to extend back to behind the end face of the duct wall when the flange connection is assembled,
   a second radial arm emanating from said outer arm and extending at a distance from and parallel with said first radial arm,
   an oblique arm extending from said second radial arm at approximately half the height of said first radial arm, and
   a second longitudinal arm emerging from said oblique arm and arranged, when the flange connection is assembled, to bear on the outside face of the duct wall, opposite said first longitudinal arm, (c) a bead extending into said hollow profile, shaped into said first radial arm, said bead being formed with a first bent portion starting from said first radial arm and a first web extending from said first bent portion approximately at a right angle to said first radial arm and situated opposite and at a distance from said outer arm, (d) said radial arms, said outer arm, and said firt web, being arranged to receive angle pieces with a close fit, (e) said bead being formed with a second web disposed between said first web and said first longitudinal arm, a second bent portion merging said second web at one end into said firt longitudinal arm, a first substantially semi-circular arc connecting said second web at the other end to said first web, (f) said second bent portion being constructed as a second substantially semi-circular arc which merges directly into said first longitudinal arm from said second web, and (g) said bead being so formed that said first arc is spaced at a distance from said first longitudinal arm which is less than the distance between opposing faces of said first and second longitudinal arms as determined by a predetermined thickness for the duct wall, whereby said bead can bear with a clamping fit on the outside face of the duct wall.

2. In a flange connection in combination with a rectangular air conditioning duct having four walls about a geometric longitudinal axis, said flange connection having:

(a) four substantially L-shaped hollow flange profiles made from sheet metal and four rectangular anglepieces, (b) viewed in the longitudinal direction of said profile, said flange profiles having substantially: a first longitudinal arm arranged to be parallel with the geometric longitudinal axis of the air conditioning duct and to bear on the inside faces of said duct walls, a first radial arm at right-angles to the geometrical longitudinal axis of said air conditioning duct, emanating from said first longitudinal member for location in front of the end face of said duct wall, an outer arm emanating from said first radial arm and arranged to extend back to behind the end face of said duct wall, a second radial arm emanating from said outer arm and extending at a distance from and parallel with said first radial arm, an oblique arm extending from said second radial arm at approximately half the height of said first radial arm, and a second longitudinal arm emerging from said oblique arm and arranged to bear on the outside face of said duct wall opposite said first longitudinal arm, (c) a bead extending into said hollow profiles, shaped into said firt radial arm, said bead being formed with a first bent portion starting from said first radial arm and a first web extending from said first bent portion approximately at a right angle to said first radial arm and situated opposite and at a distance from said outer arm, (d) said angle pieces have ends inserted with a close fit between said radial arms, said outer arm, and said first web, (e) said bead being formed with a second web disposed between said first web and said first longitudinal arm, a second bent portion merging said second web at one end into said first longitudinal arm, a first substantially semi-circular arc connecting said second web at the other end to said first web, (f) said second portion being constructed as a second substantially semi-circular arc which merges directly into said first longitudinal arm from said second web, and (g) said bead being so formed that said first arc is spaced at a distance from said first longitudinal arm which is less than the distance between opposing faces of said first and second longitudinal arms as determined by a predetermined thickness for said duct wall, whereby said bead can bear with a clamping fit on the outside face of said duct wall.

3. Flange connection according to one of claims 1 or 2, wherein when said flange profile is not applied against a duct wall, said second arc is constructed to bear against said first web.

4. Flange connection according to one of claims 1 or 2, wherein said first radial arm is in line with a tangent which can be applied against the outside face of said second arc.

5. Flange connection according to one of claims 1 or 2, comprising an edge plate having an arm held with a clamping fit between said second arc and said first web, said edge plate having a further arm projecting radially into the air conditioning duct, said second arc being set back in relation to said first radial arm so that the outside face of said first radial arm is aligned with the outside face of said further arm.

6. Flange connection according to one of claims 1 or 2, wherein when said flange profile is not applied against a duct wall, the gap between said first and second longitudinal arms is somewhat greater than the thickness of the duct wall, and said first arc extends quite close to said oblique arm.

7. Flange connection according to one of claims 1 or 2 wherein said first and second longitudinal arms are connected to the duct wall between them by a row of spot welds disposed serially in the longitudinal direction of the profile, said spot welds being spaced at a longitudianal distance from said first radial arm, said first arc bearing on the outside of the duct wall at approximately one-quarter of this longitudinal distance.

8. Flange connection according to claim 6, where said first and second longitudinal arms are connected to the duct wall between them by a row of spot welds disposed serially in the longitudinal direction of said profile, spot welds being spaced at a longitudinal distance from the first radial arm, said first arc bearing on the outside face of the duct wall at approximately half this longitudinal distance.

9. Flange connection according to one of claims 1 or 2 wherein said first and second arcs have the same radius.

10. Flange connection according to claim 9, wherein said first and second arcs extend in each case over an angular segment of between approximately 190° to 200°.

11. Flange connection according to claim 3 wherein said second arc is constructed to bear against said first web with initial force.

12. Flange connection according to claim 6 wherein said first arc is in light contact with said oblique arm.

* * * * *